A. W. MARTIN.
SUSPENSION HOOK.
APPLICATION FILED SEPT. 22, 1910.
993,262. Patented May 23, 1911.
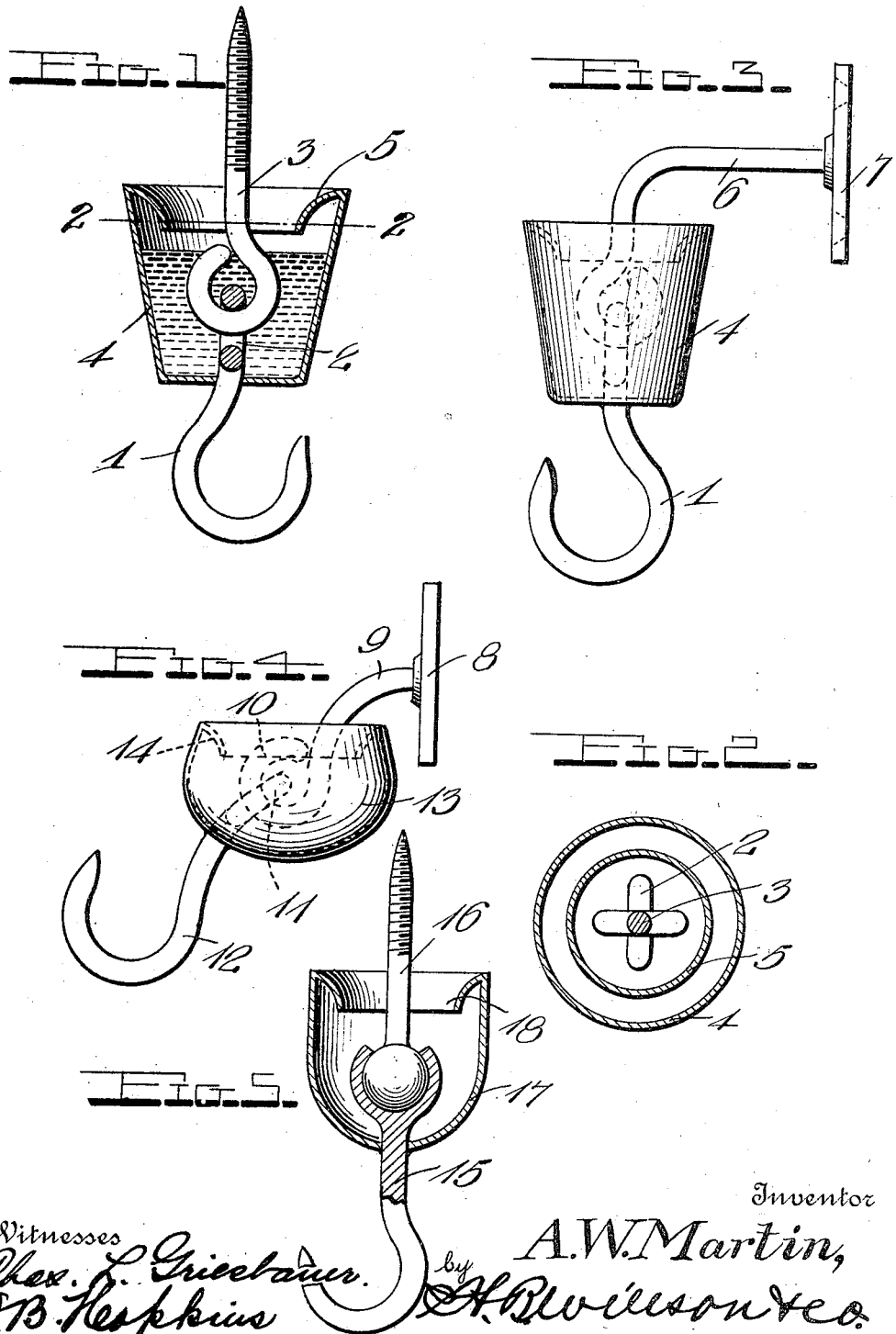

UNITED STATES PATENT OFFICE.

ALGERNON W. MARTIN, OF ATLANTA, GEORGIA.

SUSPENSION-HOOK.

993,262.

Specification of Letters Patent.  Patented May 23, 1911.

Application filed September 22, 1910.  Serial No. 583,221.

*To all whom it may concern:*

Be it known that I, ALGERNON W. MARTIN, a citizen of the United States, residing at Atlanta, in the county of Fulton and State of Georgia, have invented certain new and useful Improvements in Suspension-Hooks; and I do declare the following to be a full, clear, and exact description of the invention, such as will enable others skilled in the art to which it appertains to make and use the same.

This invention relates to an improved noiseless suspension hook.

The invention consists in the construction and arrangement of parts as will be hereinafter described and particularly pointed out in the claim.

In the accompanying drawings: Figure 1 is a side elevation partly in section of a suspension hook constructed in accordance with this invention; Fig. 2 is a horizontal section taken on the line 2—2 of Fig. 1; Fig. 3 is a side elevation showing a slightly different form of the invention; Fig. 4 is a similar view of another form of the invention; Fig. 5 is a vertical section of still another form with the hook proper broken off.

In the form of the invention shown in Figs. 1 and 2, a suspension hook 1 is provided with an eye 2 engaged with a screw eye 3 which is adapted to be connected with any suitable supporting structure. A cup 4 surrounds the joint formed by the engagement of the eye 2 of the hook member with the screw eye 3, and the bottom thereof is secured in any suitable manner to the shank of the hook, being herein shown provided with a central aperture through which the hook shank is passed and soldered or otherwise secured thereto. This cup 4 is preferably provided with an inturned downwardly extended annular flange 5 to provide means for preventing the oil or other liquid contained in the cup from splashing or being spilled out during the movement of the hook 1. The screw eye 3 is designed to be inserted into the supporting structure to a point one-fourth or one-half inch, more or less, above the upper edge of the cup to permit the cup to oscillate without coming into contact with the ceiling or other support.

In the form shown in Fig. 3 the construction is the same as that shown in Fig. 1 except the support engaging member 6 is preferably provided with a shank arranged at an angle to the body portion thereof with an attaching plate 7 secured to its free end. This shank is arranged at an angle as shown, to prevent crawling insects such as ants from dropping from the supporting structure onto the outer surface of the cup and thus passing onto the article suspended by the hook.

In Fig. 4 a hammock hook is shown comprising an attaching plate having a downwardly inclined supporting member 9 provided at its free end with a hook or eye 10 with which is engaged the eye 11 of an inclined hook 12 to the shank of which is secured an oil cup 13 provided with an oil protecting flange 14. This cup 13 is preferably connected with the shank of the hook 12 through one side of said cup to provide for the holding of the cup in upright position by said inclined hook.

In Fig. 5 a hook shank 15 is shown having a ball and socket connection with the support engaging member 16, said shank 15 being here shown passed through and secured to the center of the bottom of the cup 17 having an inturned oil projecting flange 18.

It will be obvious that this improved hook may be used for suspending any desired object and will be especially useful in meat houses and similar places to protect the meat suspended thereby from insects, rats and similar vermin.

From the foregoing description, taken in connection with the accompanying drawings, the construction and operation of the invention will be readily understood without requiring a more extended explanation.

I claim as my invention:

A suspension device for hammocks and the like comprising an oil cup with an inturned downwardly extended annular flange, said cup having an opening in its bottom, a hook having its shank portion inserted through said opening and into the cup and rigidly secured to said opening, with the hook depending from the bottom of the cup, said hook having a socket on its upper end, a shank having a screw threaded upper end, its lower end being provided with a ball thereon which is mounted in said socket and adapted to rotate therein.

In testimony whereof I have hereunto set my hand in presence of two subscribing witnesses.

ALGERNON W. MARTIN.

Witnesses:
PAUL E. JOHNSON,
WALTER C. HENDRIX.